Feb. 5, 1935. G. C. GILLESPIE 1,990,181
CAMERA
Filed June 26, 1933 3 Sheets-Sheet 1
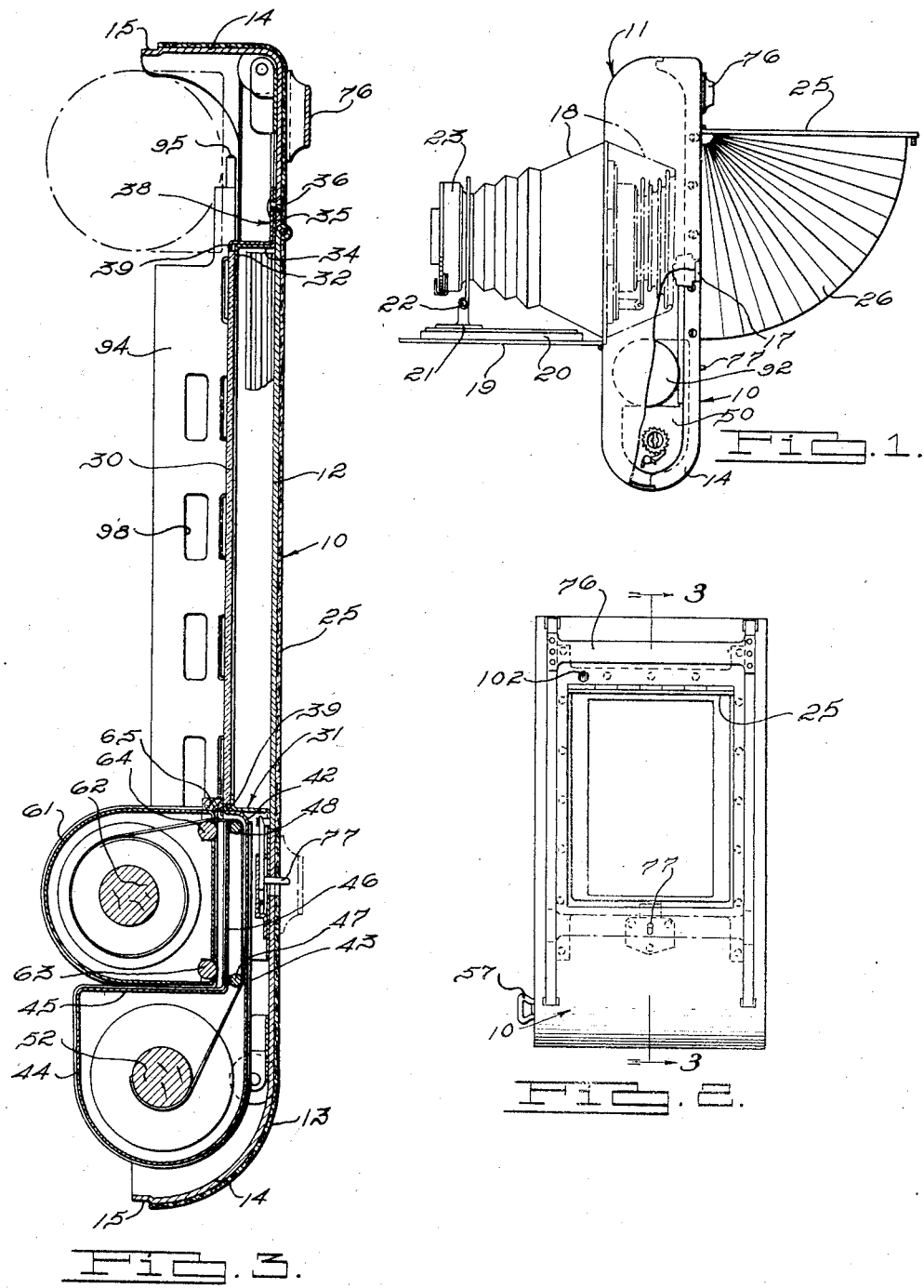
INVENTOR
Glenn C. Gillespie
BY
Harness, Dickey, Pierce & Hann.
ATTORNEYS.

Feb. 5, 1935.   G. C. GILLESPIE   1,990,181
CAMERA
Filed June 26, 1933   3 Sheets-Sheet 2

INVENTOR.
Glenn C. Gillespie
BY
Harness, Dickey, Pierce & Ham
ATTORNEYS.

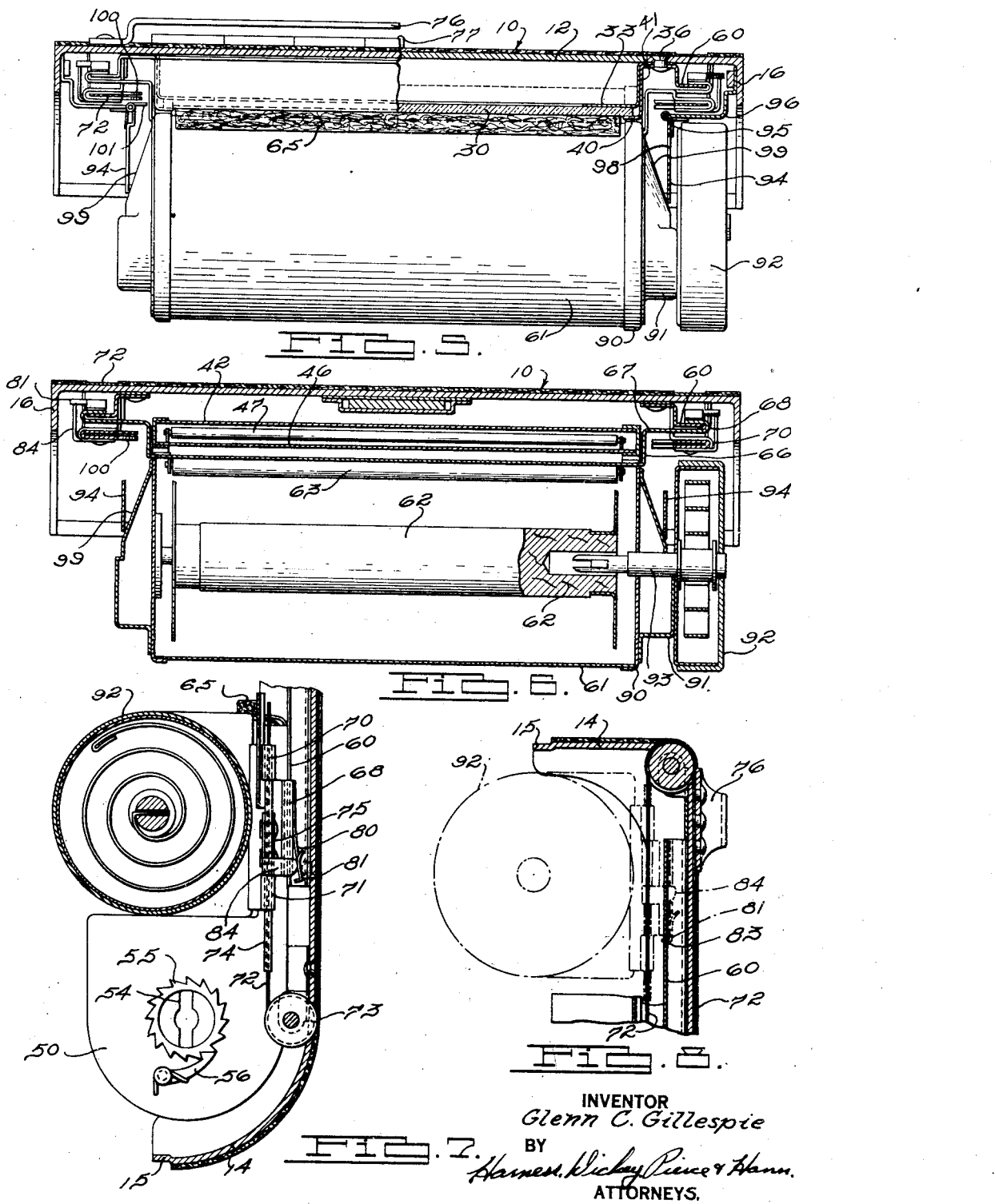

Patented Feb. 5, 1935

1,990,181

UNITED STATES PATENT OFFICE 1,990,181

CAMERA

Glenn C. Gillespie, Pontiac, Mich.

Application June 26, 1933, Serial No. 677,560

23 Claims. (Cl. 95—32)

The invention relates to photography and it has particular relation to a camera for use in conjunction with roll films.

One object of the invention is to provide a camera for roll films, having a ground glass or the like for focusing purposes, which is so constructed that the film either may be used in the conventional manner or withdrawn at any time from a position over the glass to permit use of the latter for initially focusing the object to be photographed.

Another object of the invention is to provide a camera for roll films wherein the sector of film subject to exposure during photographing of an object, will positively be maintained in a flat condition and curling or other irregularities in the contour of the exposed film will be eliminated to the end that the entire surface of the exposed sector may be in one focal plane.

Another object of the invention is to provide a camera as mentioned above wherein the film may be used either in the conventional manner or in conjunction with a focusing glass, which is so constructed that all parts of the film will be efficiently covered against exposure to light except the film sector exposed during photographic use of the camera.

Another object of the invention is to provide improved means for manipulating the film in a camera equipped with a ground glass for initially focusing the object to be photographed, to the end that the user of the camera may readily move the film into a position at one side of the glass to enable focusing and then into a position over the ground glass after focusing the object on the latter.

Another object of the invention is to provide a camera for use in conjunction with roll films and adaptable either for use in the conventional manner or in conjunction with a ground glass for focusing purposes, which is so constructed and arranged that the parts may be manufactured and assembled in an inexpensive manner while still obtaining an efficient and cooperative relation of the parts.

Other objects of the invention will become apparent from the following description, the drawings related thereto, and from the claims hereinafter set forth.

For a better understanding of the invention, reference may be had to the accompanying drawings forming a part of the specification, wherein:

Figure 1 is a side elevational view of a camera constructed according to one form of the invention with certain parts in their open positions and other parts broken away to illustrate details of construction more clearly.

Fig. 2 is a rear elevational view of the construction shown by Fig. 1.

Fig. 3 is a cross-sectional view on a larger scale taken substantially along the line 3—3 of Fig. 2, with the front cover of the camera removed.

Fig. 5 is a cross-sectional view taken substantially along the line 5—5 of Fig. 4.

Fig. 6 is a cross-sectional view taken substantially along the line 6—6 of Fig. 4.

Fig. 7 is a cross-sectional view on a slightly larger scale, taken substantially along the line 7—7 of Fig. 4.

Fig. 8 is a cross-sectional view on a slightly larger scale, taken substantially along the line 8—8 of Fig. 4.

Figure 4:
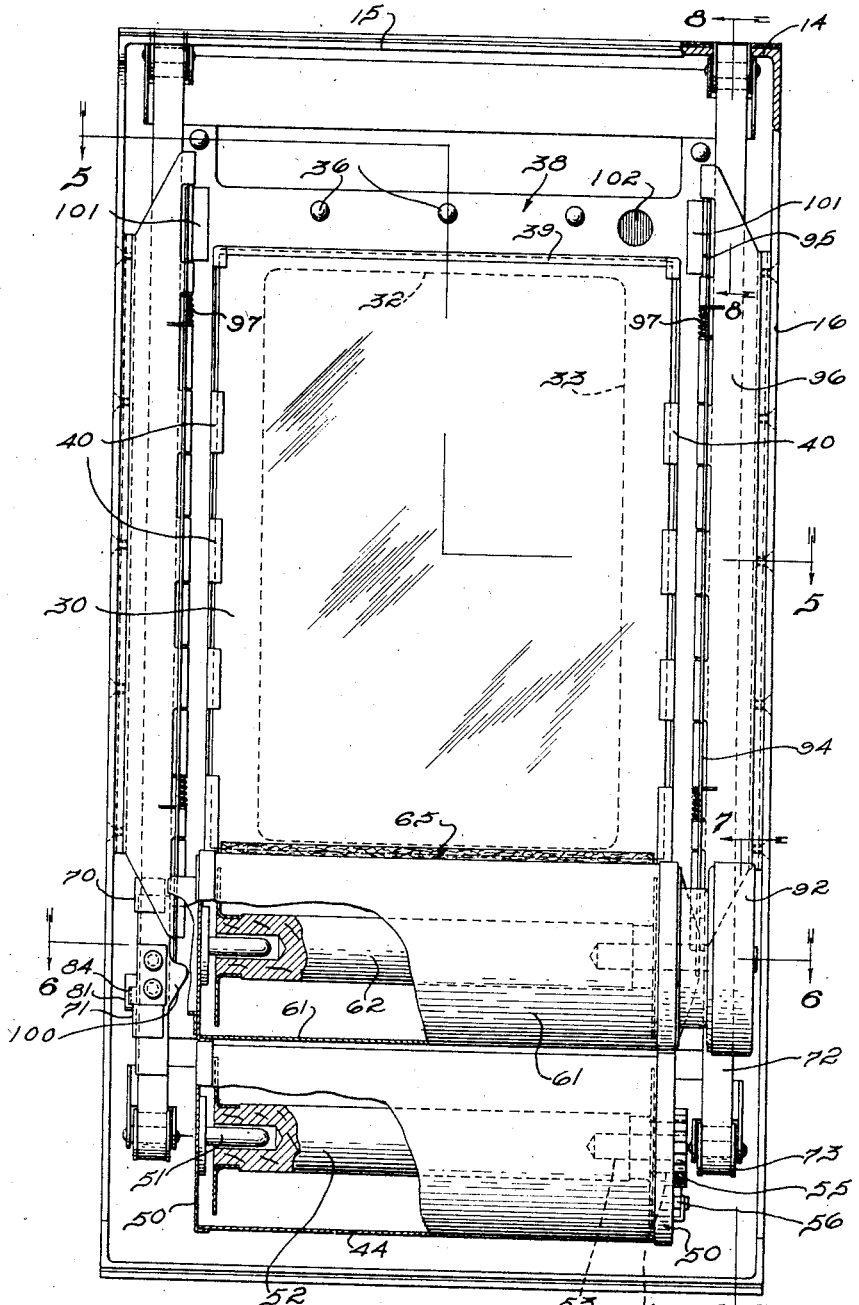
Fig. 4 is a front view of the construction shown by Fig. 3, with certain parts broken away for the purpose of illustrating certain details of construction.

Referring to Fig. 1, the casing of the camera illustrated comprises a back plate 10 and a front covering member 11, and such casing members preferably are constructed of sheet metal covered with leather or the like, as indicated at 12 and 13, respectively, in Fig. 3. As shown best by the latter figure, the ends of the back plate 10 are provided with projecting flanges 14, terminating in inwardly offset shoulders 15 that are adapted to receive complementary portions at the ends of the front cover member 11. As shown best by Figs. 5 and 6, the longitudinal and side edges of the back plate 10 are provided with narrow, metal flanges 16 and in assembling the casing members, the side walls of the front cover member telescopically receive such flanges. The casing members may be releasably connected by conventional and releasable latching means such as indicated at 17 in Fig. 1.

As also shown by Fig. 1, the front wall of the cover member 11 has a conventional, camera opening and around the edges of this opening, an expansible and light proof bellows 18 is secured to the front wall of the cover member. For closing the opening, a pivoted cover 19 is provided which has a guide 20 adapted to receive a slide 21 that is pivotally connected as indicated at 22, to a lens mounting 23 associated with the front end of the bellows 18. When the cover 19 is to be closed, the slide 21 is moved rearwardly until the lens is at the rear end of the slide and then upon moving the cover into its closed position, the bellows collapses and with the lens mounting, moves into a position in the casing as shown in broken lines. It will be appreciated that the lens is adjustable by means of the slide 23 and also that when the bellows is in its expanded position, it does not project rearwardly into casing beyond the front wall of the cover member 11, thus leaving the interior of the casing clear for movement of certain parts to be hereinafter described.

The back plate 10 similarly has an opening which is adapted to be exposed or closed by means of a pivoted cover 25 having collapsible shrouds 26 secured to its opposite side edges and to the back plate along side edges of the opening. It will be appreciated that when the cover is in its open position, the side shrouds in conjunction with the cover shut out light around three sides of the opening in a desirable way, so that the photographer may make observations through the opening in the back plate without interference from a large amount of light.

Referring now to Figs. 3 and 5, a ground glass 30 is disposed in spaced relation to the cover 25 when the latter is in closed position and is supported on a stamped sheet metal frame 31 open at its center to expose the glass. The frame is provided at opposite ends with short flanges 32 disposed under end portions of the glass and at its sides and as best shown by Fig. 5, the frame has wider flanges 33 for supporting side portions of the glass. The flanges 32 and 33 define the effective margin of the glass for focusing purposes, and this exposed area of the glass substantially is of the same shape and dimensions as that of the effective part of a film sector upon which the object is to be photographed. For securing the frame to the back plate 10, the former has a wall portion 34 directed toward the base of the plate, that terminates in a flange 35 which is riveted to the sheet metal 12 along the edges of the opening in the plate as indicated at 36.

For holding the glass on the frame 31, a sheet metal frame 38 is provided which is open to expose the opposite surface of the glass. As shown by Fig. 3, the frame 38, along upper and lower edges of the glass, has lips 39 that are directed into abutting engagement with the end faces of the glass, whereas along the side edges of the glass, and as shown by Figs. 4 and 5, the frame has spaced lips 40 that extend slightly over the side edges of the glass to positively hold it against the supporting frame 31. The frame 38 has angular flange portions 41 along the sides and upper edge of the glass, which fit over the angular portions 34 and 35 of the frame 31 and are also secured to the back plate by the rivets 36.

Referring now to Fig. 3, the frame 38 at the lower edge of the casing has a flange portion 42 which extends toward the back plate and then merges with a flat portion 43 extending longitudinally of the casing and toward the lower end thereof. This flat portion joins a reversely directed portion 44, in turn merging with a portion 45 directed normal to the portion 43, and adjacent the latter, but spaced therefrom, the portion 45 joins a flat portion 46 extending to a point slightly spaced from the flange 42. This construction provides a housing for a spool for film, and includes a narrow guideway or auxiliary housing defined by the portions 43 and 46, that extends to a point adjacent the edge of the glass. Within such guideway, rollers 47 and 48 are provided at opposite ends for guiding film into and through the guideway and into the spool receiving part of the housing. The ends of the housing are closed as best shown by Fig. 4, by releasable covers 50 which have narrow and elongated portions for also closing the guideway portion of the housing in which the rollers 47 and 48 are located. It will thus be appreciated that when the covers are in position, the housing is completely closed except for the narrow and film entry between the roller 48 and the adjacent flange 42 at the edge of the glass.

As also shown by Fig. 4, the cover 50 at the left end of the housing has a spindle 51 for rotatably supporting one end of a spool 52 for exposed film, whereas the opposite cover 50 includes a rotatable spindle 53 and a key 54 adapted normally to engage a key way in the end of the spool. Outside of the cover a ratchet disc 55 is operatively connected to the spindle and key 54, and this disc has a key way adapted to engage a rotary key 57 shown by Fig. 2, conventionally provided on cameras for turning the spool for exposed film. This key is provided on the cover member 11 and usually is slidably mounted so as to permit insertion and withdrawal of the key with respect to the key way. A spring pressed pawl 56 is mounted on the cover 50 adjacent the ratchet disc 55, to prevent reverse turning of the spool. It will be appreciated that other suitable devices may be provided for allowing such rotary movement of the spool in one direction while preventing reverse turning of the spool.

From the description so far given it will be understood that a stationary spool housing is provided at the lower end of the camera casing wherein the spool receiving part of the housing is substantially spaced from the adjacent edge of the focusing glass. It will also be understood that the narrow and elongated guideway having the rollers therein provides a means for housing film to a point closely adjacent the adjacent edge of the focusing glass. It will also be appreciated that the glass is firmly held in position but that it is exposed for focusing an object to be photographed thereon so that the object may be seen when the cover 25 for the camera casing is in its open position.

Now referring to Figs. 5 and 6 it will be noted that the sheet metal frame 38 along the sides of the glass and beyond the rivets 36, has portions directed to provide guide rails 60 which are disposed in spaced relation to the metal portion 12 of the back plate 10. These guide rails are adapted to slidably support a movable film housing indicated at 61 and, as best shown by Fig. 3, such housing when in one position is disposed between the stationary spool housing and the edge of the focusing glass and in a position over the guideway.

Referring now to Fig. 3, the movable housing 61 is adapted to receive a spool of unexposed film indicated at 62 and such housing has rollers 63 and 64 partially projecting through slots in the base wall of the housing and adapted to engage the film. When the housing is in the position shown by Fig. 4, the roller 64 is immediately above the roller 48 in the stationary guideway, and adjacent such roller 64, the housing has an exit opening for the film so that it may be directed out of such housing and into the narrow entry opening of the guideway adjacent the roller 48. When the movable housing is in the position shown in Fig. 3, it will be appreciated that this exit opening is immediately above the entry opening of the stationary housing so as to reduce exposed film to a very small sector.

Preferably and as shown by this figure, a strip of felt 65 is secured to the movable housing 61 so as to engage the glass 30, and the purposes of the felt are to maintain the glass in a clean condition by wiping it during movement of the housing and also to provide a more perfect seal against light entering the space between the lower wall of the housing and the lip 39 at the lower edge of the glass, when the housing 61 is adjacent the stationary housing. Thus, even the small sector of film extending between rollers 48 and 64 is protected in the event the cover 25 is opened when the housings are so related or if for any other reason the housings are exposed to light.

As shown by Figs. 6 and 7, the base portion of the movable housing 61 at opposite ends thereof, has flanged portions 66 that extend over the narrow portions of the covers 50 for the guideways, and then terminate in laterally directed flange portions 67. Such flange portions 67 are provided with reversely directed U-shaped portions 68 receiving the guide rails 60, and at either side of said U-shaped portions, U-shaped portions 70 and 71 are stamped from the flange but are located in spaced relation to the guide rails. The U-shaped portions 70 and 71 at each side of the casing are adapted to cooperate with an endless band 72 tightly trained about rollers 73 at opposite ends of the casing, and adjacent each of said rollers, the casing wall is apertured so that the endless band may have one run extending longitudinally and along the outside of the casing. That portion of the endless band passing through the U-shaped guide elements 70 and 71 has a U-shaped reinforcing strip 74 thereon to provide more rigidity to this portion of the band and between the U-shaped guide elements abutment plates 75 are riveted to the reinforcing portions 74 and band to provide an enlargement adapted selectively to engage one or the other of the guide elements 70 and 71 while permitting a certain amount of play or idling movement of the band when the latter is moved in a reverse direction.

For moving the endless bands, and as best shown by Figs. 3 and 8, a hand grip 76 is provided, which has relatively wide end flanges riveted or otherwise secured to the endless bands 72. Each of the flanges overlaps one of the bands over a substantial linear portion of the band and is secured thereto by several rivets, if rivets are employed, so as to provide a more rigid association between the bands and grip. It is important that both ends of housing 61 move freely, uniformly and equally, and that cocking and binding of the housing on the rails 60 be avoided and the rigid association of the grip 76 with the taut bands 72, practically eliminates any possibility of such cocking and binding of the housing on the rails. When this grip is moved from the upper end of the casing as seen in Fig. 3, to the dotted position at the lower end of the casing, it is apparent that the movable housing will be moved to the upper end and broken line position. In this connection it may be noted that a slidable latch 77 is provided for holding the cover 25 in closed position and when the hand element 76 is in its lower and broken line position and hence when the movable housing is at the upper end of the casing, the hand grip covers the latch and normally will prevent accidental movement of the latch to permit opening of the cover although it is evident that the latch may be released even with the grip in covering relation thereto, if this is desired at any time.

From the description so far given, it is apparent that when the movable housing is in the position shown in Fig. 3, the focusing glass 30 is exposed for focusing an object to be photographed thereon and it will be appreciated that none of the film is exposed and particularly at the edge of the glass, owing to the fact that only a small sector of film is exposed where it enters one housing and leaves the other and this is protected by the felt 65. When the movable housing is moved to the other end of the casing so as to expose the film across the focusing glass, it is apparent that the picture may be taken.

In order to enable use of the camera in the conventional way by locating and maintaining both spools at opposite ends of the casing, and for holding the movable housing at the upper end of the casing, spring latching elements 80 are secured to the U-shaped portions 68 on the movable housing and such latching elements terminate in lips 81 which are adapted to enter notches 83 in the rails 60 when the movable housing is moved to such upper end of the casing, as shown by Fig. 8. For releasing the latches, the abutment plates 75 on the endless bands between the guide elements 70 and 71, are provided with cam elements 84, and when the movable housing is in the position shown in Fig. 7, or is moving to such position, the cam elements hold the latch elements in released positions. When the bands are moved to effect movement of the movable housing to the upper end of the casing, the plates 75 on the endless bands move toward the U-elements 70, thus moving the cams 84 away from the latches and releasing them. Then during movement of the movable housing, the latches ride along under the guide rail until the lips 81 register with the openings 83 in the guide rails at the upper end of the casing following which the latch elements snap into locked position with respect to the guide rails. As thus arranged, the spools are in such positions that the camera may be used in the ordinary way. When it is desired to move the movable housing again to its position shown by Fig. 3, initial movement of the endless bands causes the plates 75 thereon first to move into engagement with the U-elements 71 on the movable housing and this initial and free movement of the endless bands causes release of the latching elements.

It will be appreciated, of course, that when the movable housing with its spool of unexposed film is moved into the upper position as seen in Fig. 3, the film will unwind, as a reverse movement of the spool in the stationary housing is prevented by the latch and pawl arrangement or other suitable device that may be provided. A reverse movement of the movable housing then requires a rewinding of the film on the spool therein and for accomplishing this result, a spirally arranged spring is used which is tensioned upon initial winding of the spool 52 and also upon moving the housing to its upper position and this tensioned spring, during movement of the housing to its lower position, rewinds the film. In this connection and as seen by Fig. 6, the ends of the movable housing 61 are closed by covers 90, and the cover at the right end has a hollow portion 91 secured thereto that in turn is secured to a spring housing 92. A spindle 93 releasably but lockingly engaging the spool 62 in the movable housing extends into the spring housing and as shown by Fig. 7, has one end provided with a slot for the spring. The other end of the spring is rigidly connected to a part of the housing construction. While the number of coils or turns in the spring depends upon the amount of film employed, it is to be understood that the size of the spring will be sufficient to enable complete unwinding of the film before a complete winding of the spring occurs.

For the purposes of holding edge portions of the film against the face of the glass, spring pressed blades 94 are pivotally mounted as indicated at 95, on sheet metal members 96 secured to the flange portions 16 of the back plate and the pintle portions of the pivot have springs 97 operatively connected to the plate and to the members 96 so as to normally urge the plates toward and against the glass. Such plates have longitudinally spaced openings 98 to receive the lip elements 41 holding the glass in position, so as to permit movement of the plate flatly against the film on the glass without interference from the lips. Thus the plates may resiliently press against the film edges to hold the latter against the glass. When the movable housing is in its lower position, the plates 94 are moved into upright positions or in planes at right angles to the glass, and for accomplishing this result, the hollow portions 91 of the covers 90 on the movable housing have cam portions 99 which retain the plates in their upright positions. When the movable housing is moved to its upper position as shown in Fig. 3, the ends of the latter move beyond the ends of the plates 94 and the latter resiliently fall into positions against the edges of the film, thus resiliently and positively maintaining such edges against the glass. For reverting the plates to their upright positions when it is desired to move the movable housing to its lower position, cams 100 on the endless bands first engage projecting portions 101 secured to the plates and turn them into the upright positions. After such plates are in their upright positions and as the portions 101 on the plates move out of engagement with cams 100, the plates engage the cam portions 99 of the covers 91 and are thus maintained in their upright positions during movement of the movable housing to the other end and also while the movable housing is in position adjacent the stationary housing.

When it is desired to remove the spools and replace them, it is apparent that the left end cover for the movable housing can be removed, as the plate 94 adjacent this end of the housing can be tilted farther to the left. Upon movement of the movable housing to a point beyond the roller 48 in the stationary housing, or with the movable housing even in its locked position at the upper end of the casing, the cover for the latter at the left end thereof can be removed. With both covers removed, the spools can be withdrawn from the housings and spools substituted therefor, during which the film may be threaded through the opening and over the rollers between the spools and under the plates 94, in the event the movable housing is in its upper position. Then the covers for the housings are applied to the ends thereof. Initial winding of the film on the spool in the stationary housing may so tension the spiral spring that if the movable housing is returned to a position adjacent the stationary housing, the length of film between spools will be automatically wound around the spool in the movable housing, or else if the movable housing is returned, such return can be effected at the same time that the stationary spool is turned. In either event, after replacing the spools, and if the movable housing is moved to a position, adjacent the stationary housing, the spring initially may be in an untensioned condition or in a partially tensioned condition if the spool 52 is initially wound. The casing member 11 may then be placed on the back plate 10.

For determining the position of sectors of the film, the back wall of the casing may have an opening adjacent its upper end and adjacent portions of the flanges on frames 31 and 38 may have openings coinciding with the opening in the back plate. When the movable housing is in its upper position it is apparent that beyond the upper edge of the glass, the film and usual paper cover for the film will extend in the plane of the glass and under the movable housing, so that the film cover may be seen through the openings mentioned. Such openings, or at least one of them, may be covered by the usual red glass or celluloid, indicated for example at 102 in Fig. 4, so as to exclude any light that might damage the film.

Assuming that a new spool of unexposed film is in the movable housing, and that the latter is at the lower end of the casing and adjacent the stationary housing, optional use of the camera may be effected as follows. If it is desired to use the camera in the conventional way, the hand grip 76 connected to the endless bands is moved from its position at the upper end of the casing to a position adjacent the lower end of the casing and in covering relation to the latch for the cover 25. Initial movement of the grip and bands, moves the cams 84 out of engagement with latches 81 and then the plates 75 on the bands engage the eye elements 70 on the movable housing and move it to the upper end of the casing, and until the latches 81 snap into openings 83 in the rails 60 to lock the housing in its upper position. During this movement of the movable housing, the film is unwound from the unexposed spool and trained across the focusing glass 30, and also becomes tensioned in a longitudinal direction owing to the fact that the coil spring becomes partially wound. Moreover, after such movement of the movable housing, the side plates 94 flip into resilient engagement with the side edge portions of the film and resiliently maintain such portions against the glass. Thus the film is positively prevented from curling and is maintained in a flat condition. It will be appreciated that when the movable housing is in such position, the hand grip 76 normally will prevent any ordinary or accidental release of the latch of the cover 25, from which it follows that the cover normally will not open when the film is disposed over the glass. Then by turning the spool in the stationary housing, the first sector of unexposed film can be accurately positioned over the glass through the instrumentality of the vision opening and red glass 102 at the upper end of the casing. The picture can now be taken in the ordinary way. Pictures can be taken on succeeding sectors of the film by successively turning the spool in the stationary housing and if all of the pictures are taken in this way, the movable housing can be returned to its position adjacent the stationary housing after taking the last picture or the film can be completely wound on the stationary spool without returning the movable housing to a position adjacent the stationary housing.

If the focusing glass is to be used, the movable housing can be returned to a position adjacent the stationary housing at any time and, since the coil spring will be tensioned, the unexposed film over the glass will automatically be wound about the spool in the movable housing as the latter is returned to such position adjacent the stationary housing. During this movement of the movable housing, the hand grip 76 moves to a position adjacent the upper end of the casing, and this permits release of the cover 25 and opening thereof as shown by Fig. 1. Then the object to be photographed may be focused on the glass 30. Following this operation, the cover 25 is closed, and then the movable housing is returned to its position adjacent the upper end of the casing. The sector of unexposed film now disposed over the glass is substantially in the same plane as the latter and hence substantially in the focal plane thereof. It follows that the picture taken will be focused substantially on the film and it has been determined that the slight thickness of film is negligible in so far as variation of the focal plane is concerned. After taking the picture in this manner, the movable housing may be returned to its position adjacent the stationary housing and succeeding pictures taken in the same way or, if desired, the movable housing may be maintained in the upper end of the casing, and other pictures taken in the conventional manner. In the event a sector of film is over the glass 30, and it becomes necessary to remove the front casing member 11, the movable housing may be returned to its position adjacent the stationary housing, during which the sector of film will be wound up. Then the casing member 11 may be removed without subjecting any part of the film to light exposure. After replacing the cover, the movable housing may be returned to its upper position, which automatically places the same sector of film over the glass. Thus, at any time the casing can be opened without damaging the film by light exposure, as the film is not exposed with the housings in adjacent positions.

The construction of the camera provided is relatively simple, and it will be appreciated that most of the parts may be manufactured from sheet metal or the like and that the stamping operations incidental thereto, may be inexpensive. The double utility of the camera, that is the use thereof for taking pictures that have first been focused on a ground glass, or the taking of pictures in the conventional way renders the camera useful either for the skilled and professional photographer or the amateur. In other words, the camera is of such construction that the amateur may use it in the same manner that cameras always have been used in conjunction with roll films, or it may be used either by the amateur or the professional photographer in the taking of pictures in which accurate focusing is desired.

Although only one form of the invention has been illustrated and described in detail, it will be apparent to those skilled in the art that various modifications may be made without departing from the scope of the appended claims.

I claim:

1. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in the positions at opposite sides of the focal area so as progressively to move sectors of the unexposed film over said focal area, and optional means independent of any winding of the spool for exposed film for moving the film to a position beyond one edge of said focal area while the film is wound on both spools.

2. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in the positions at opposite sides of the focal area so as progressively to move sectors of the unexposed film over said focal area, and optional means for moving one spool to a position adjacent the other spool and at the same side of the focal area while the film is wound on both spools while simultaneously causing the film over the focal area to be wound on the spool so moved.

3. A camera for use in conjunction with roll film, comprising a casing, an adjustable lens on one side of the casing, a focusing glass at the back of the casing opposite the lens, means rendering said glass visible while adjusting the lens to locate the focal plane in substantially the plane of the glass, spools at opposite edges of the glass for receiving unexposed film and for winding the exposed film, respectively, while allowing sectors of unexposed film to move over the glass, means for winding the spool for the unexposed film and thus progressively moving the film over the glass while maintaining the spools in the positions set forth, and optional means for moving the film beyond one edge of the glass while maintaining both spools within the casing and without removing the film from the casing.

4. A camera for use in conjunction with roll film, comprising a casing, an adjustable lens on one side of the casing, a focusing glass at the side of the casing opposite the lens, means rendering said glass visible while adjusting the lens to locate the focal plane in substantially the plane of the glass, spools at opposite edges of the glass for receiving unexposed film and for winding the exposed film, respectively, while allowing sectors of unexposed film to move over the glass, means for winding the spool for the unexposed film and thus progressively moving the film over the glass while maintaining the spools in the positions set forth, and optional means for moving one spool to and from a position adjacent the other and at the same edge of the glass and simultaneously winding the sector of film disposed over the glass, to allow focusing on the glass and then a return of the moved spool to its former position and disposal of the same sector of film over the glass.

5. A camera for use in conjunction with roll film, comprising a casing having a film exposing and focal area, and a space beyond one edge of said area and within the casing for simultaneously receiving a spool for unexposed film and a spool for winding the exposed film, means maintaining one of the spools stationary with respect to the casing, means for moving the other spool to a position beyond the opposite edge of the focal area, means for preventing exposure of the film other than the sector over the focal area, when the spools are at opposite sides of said area, and means for winding the film on one spool while the spools are in the latter position.

6. A camera for use in conjunction with roll film, comprising a casing having a lens and a focal area, and a space beyond one edge of the area for receiving a spool for unexposed film and a spool for winding the exposed film, stationary housing means for one of said spools, movable housing means for the other spool and adapted for movement to the opposite edge of the focal area, means for preventing exposure of film other than the film over said area, when the movable housing means is at said opposite edge of the exposure area, and means for winding the film on one spool while the spools are at opposite sides of the focal area.

7. A camera for roll film comprising a casing having a lens and a focal area, a stationary housing spaced from one edge of the focal area for receiving a spool for film, a movable housing for another spool and disposed between the first housing and such edge of the focal area, means for guiding and moving said movable housing over the focal area and to the opposite edge of the focal area, means for allowing film to be conducted out of one housing and into the other, means for housing the film between the first housing and the adjacent edge of the focal area, when the second housing is at the opposite edge of the focal area, and means for winding the film on one spool when the spools are at opposite edges of the focal area.

8. A camera for roll film comprising a casing having a lens and a focal area, a stationary housing spaced from one edge of the focal area for receiving a spool for film, a movable housing for another spool and disposed between the first housing and such edge of the focal area, means for guiding and moving said movable housing over the focal area and to the opposite edge of the focal area, means for allowing film to be conducted out of one housing and into the other, and means for housing the film between the first housing and the adjacent edge of the focal area, when the second housing is at the opposite edge of the focal area, said last mentioned means comprising an auxiliary housing operatively connected to the first housing, and extending substantially to the adjacent edge of the focal area.

9. A camera for roll film comprising a casing having a lens and a focal area, a stationary housing spaced from one edge of the focal area for receiving a spool for film, a movable housing for another spool and disposed between the first housing and such edge of the focal area, means for guiding and moving said movable housing over the focal area and to the opposite edge of the focal area, means for allowing film to be conducted out of one housing and into the other, and means for housing the film between the first housing and the adjacent edge of the focal area, when the second housing is at the opposite edge of the focal area, said last mentioned means comprising an auxiliary housing operatively connected to the first housing and which extends substantially to the adjacent edge of the focal area and at one side of the second housing when the latter is between the focal area and the first housing.

10. A camera for roll film comprising a casing having a lens and focal area, means beyond one edge of the focal area for receiving a spool for film, movable means for receiving and moving another spool to a position adjacent to the first spool or to a position at the opposite edge of the focal area, and spring means operatively connected to one spool for turning it and winding the film thereon during movement of the movable means to a position adjacent the first spool.

11. A camera for roll film comprising a casing having a lens and a focal area, means beyond one edge of the focal area for receiving a spool for film, movable means for receiving and moving another spool to a position adjacent to the first spool or to a position at the opposite edge of the focal area, and means normally tending to rotate one of the spools and to apply tension to the film between the spools.

12. A camera comprising a casing having a lens and a focal area, spools adapted to be disposed at opposite edges of the focal area for receiving film extending between the spools and over the focal area, means in the casing for supporting the film in said focal area, and pivotal means resiliently holding the linear edge portions at opposite edges of the film against the support so as to prevent curling of the film sector in said area.

13. A camera comprising a casing having a lens and a focal area, spools adapted to be disposed at opposite edges of the focal area for receiving film extending between the spools and over the focal area, means in the casing for supporting the film in said focal area, pivotal means resiliently holding the linear edge portions at opposite edges of the film against the support so as to prevent curling of the film sector in said area, and means constantly maintaining said film sector in longitudinally directed tension.

14. A camera comprising a casing having a lens and a focal area, means at one edge of the area for receiving a spool for film, means for receiving another spool for film and movable from a position at the same edge of the area to a position at the opposite edge of the area, means for supporting the film between the spools when the latter are at opposite edges of the area, pivotal means for maintaining opposite, linear edge portions of the film against the supporting means when the spools are at said opposite edges of the area, and means for withdrawing said maintaining means when the movable means is to be moved to a position adjacent the first spool.

15. A camera comprising a casing having a lens and a focal area, means at one edge of the area for receiving a spool for film, means for receiving another spool for film and movable from a position at the same edge of the area to a position at the opposite edge of the area, means for supporting the film between the spools when the latter are at opposite edges of the area, means for maintaining opposite, linear edge portions of this film against the supporting means when the spools are at said opposite edges of the area and means for automatically withdrawing said maintaining means when the movable means is being moved to a position adjacent the first spool.

16. A camera comprising a casing having a lens and a focal area, a spool for film at one edge of the focal area, means for receiving another spool for film and being movable to a position adjacent the first spool or to a position at the opposite edge of the area and means for moving said movable spool receiving means and including a manually operable element accessible to the exterior of the casing and which is movable in a direction opposite the direction of movement of the movable spool receiving means.

17. A camera comprising a casing having a lens and a focal area, a spool for film at one edge of the focal area, means for receiving another spool for film and being movable to a position adjacent the first spool or to a position at the opposite edge of the area, flexible means connected to said movable spool receiving means for moving the latter, and manually operable means at the exterior of the casing for moving said flexible means.

18. A camera comprising a casing having a lens and a focal area, a spool for film at one edge of the focal area, means for receiving another spool for film and being movable to a position adjacent the first spool or to a position at the opposite edge of the area, an endless flexible element connected to the movable spool receiving means and means accessible to the exterior of the casing for moving said element.

19. A camera for roll film comprising a casing, a stationary glass in the casing for focusing the object to be photographed, housing means in the casing at one edge of the glass for receiving a spool for exposed film, housing means for receiving a spool for unexposed film and movable from a position at said edge of the glass to a position at the opposite edge of the glass, and a movable cover for covering or exposing said glass.

20. A camera for roll film comprising a casing, means in the casing for receiving a spool for exposed film, movable means for receiving a spool for unexposed film, means for moving the movable means to a position spaced with respect to the first means or to a position adjacent thereto, releasable means for locking the movable means in its position spaced with respect to the first means, and means for effecting release of the locking means during initial actuation of the moving means and prior to movement of the movable means.

21. A camera comprising a casing having a lens and focal area, a spool for film at one edge of the focal area, means for receiving another spool for film and being movable to a position adjacent the first spool or to a position at the opposite edge of the focal area, flexible elements connected at their ends to the ends of the movable means respectively and extending to opposite ends of the casing and to the exterior thereof and along the edges of the casing, and means connecting said flexible elements exteriorly of the casing for moving them simultaneously and insuring substantially equal movement of the ends of the movable means so as to avoid cocking thereof in the casing.

22. A camera for use in conjunction with roll film, comprising a casing having a film exposing and focal area, and a space beyond one edge of said area for simultaneously receiving a spool for unexposed film and a spool for winding the exposed film, means for moving one spool to a position beyond the opposite edge of the focal area, means for preventing exposure of the film other than the sector over the focal area when the spools are at opposite sides of said area, and means for winding the film on one spool while the spools are in the latter positions.

23. A camera for use in conjunction with rolled film comprising a casing having a film exposing and focal area and a space beyond one edge of said area for simultaneously receiving a spool for unexposed film and a spool for winding the exposed film, separate housings in the casing for receiving the spools respectively, means for moving one housing and spool to the other side of said area, and a narrow housing portion projecting from one housing and adapted to project under the other housing when the housings are in adjacent relation beyond said edge of the focal area, said narrow housing portion being adapted to conceal the film extending between the spools when the housings are disposed in the adjacent relation mentioned.

GLENN C. GILLESPIE.